Sept. 10, 1946.       H. SPOONER       2,407,350
NUTCRACKER
Filed April 24, 1945
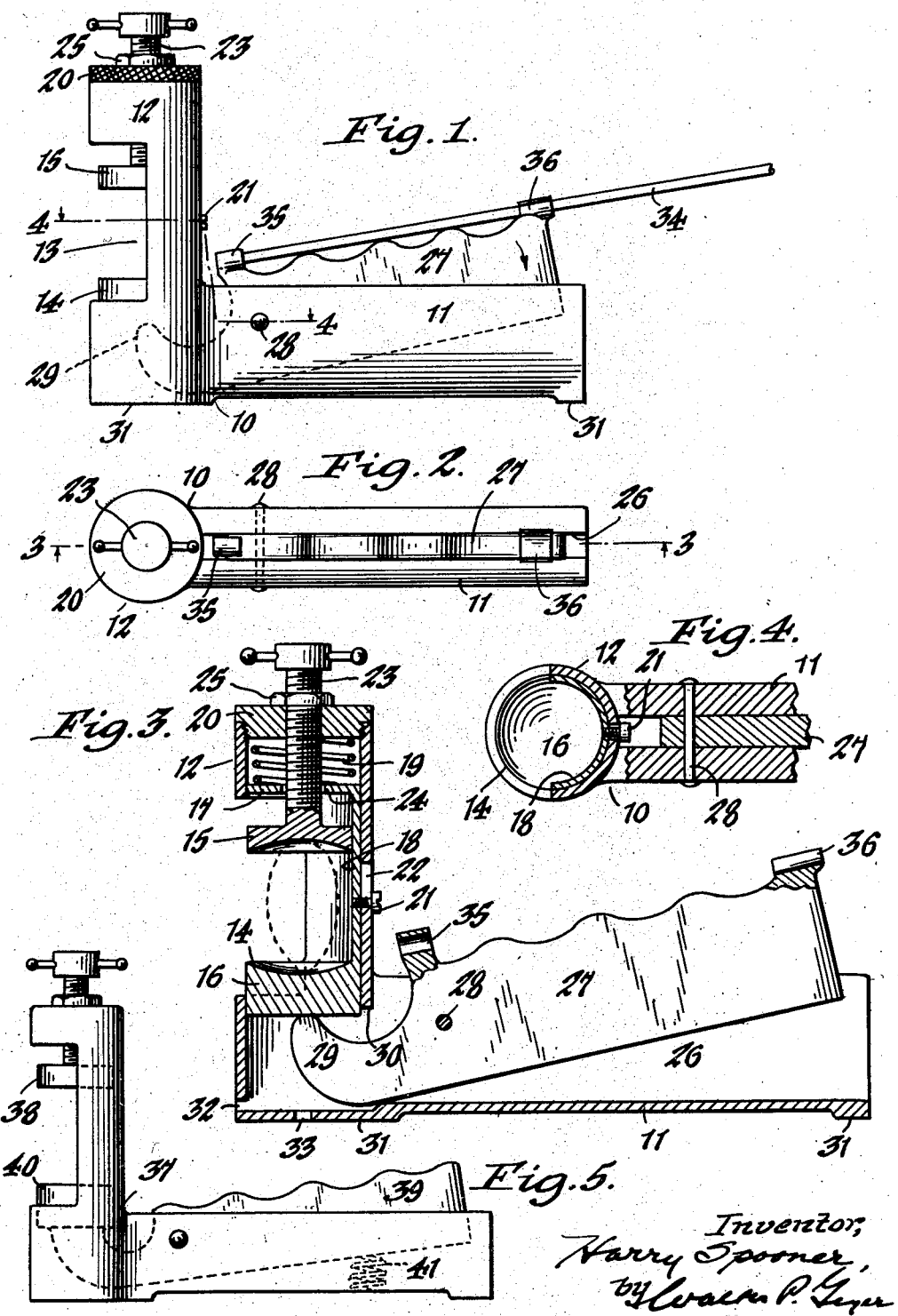
Inventor,
Harry Spooner,
by Evarts P. Geyer
Attorney.

Patented Sept. 10, 1946

2,407,350

UNITED STATES PATENT OFFICE 2,407,350

NUTCRACKER

Harry Spooner, Stephens, Ark.

Application April 24, 1945, Serial No. 590,063

2 Claims. (Cl. 146—15)

This invention relates to certain new and useful improvements in devices for cracking edible nuts.

It has for one of its objects to provide a nut cracker which is simple, compact, and inexpensive in construction, and which is so designed as to enable the nuts to be cracked easily and expeditiously with a minimum of effort and without danger of pinching one's hand or fingers.

Another object of the invention is to provide a device of this character which is portable and capable of being used in the hand or, if desired, mounted on a table or bench when cracking a large batch of nuts, which is further so designed that the shells and nut meats will be confined and not fly out or be dispersed in a promiscuous fashion, and which lends itself for ready cleaning when necessary.

Other features of the invention reside in the construction and arrangement of parts hereinafter described and particularly pointed out in the appended claims.

In the accompanying drawing:

Figure 1 is a side elevation of the nut cracker embodying my invention. Figure 2 is a top plan view of the same. Figure 3 is an enlarged vertical longitudinal section taken on line 3—3, Figure 2. Figure 4 is an enlarged horizontal section taken on line 4—4, Figure 1. Figure 5 is a sectional side elevation of a modified form of the invention.

Similar characters of reference indicate corresponding parts throughout the several views.

In the embodiment of the invention shown in Figures 1-4, inclusive, my nut cracker comprises a substantially L-shaped body 10 made of any suitable material and including a handle or base portion 11 which is adapted to be conveniently gripped in the hand or fastened to a table or bench when cracking the nuts, and a nut-receiving portion or section 12 extending laterally from said handle. This nut-receiving section is preferably cylindrical, being recessed or open at its outer side substantially centrally thereof, as indicated at 13, and mounted on such section and extending into the recessed portion thereof in opposing relation to each other are the relatively movable nut cracking jaws or anvils 14 and 15.

The jaw 14 constitutes the movable or force exerting element and is in the form of a recessed plunger or carriage guided in the bore of the cylindrical body-section 12 in registering relation with the recess 13 thereof and provided at its lower end with a cupped or concavely-recessed head 16 to support one end of the nut, while its upper end terminates in an abutment 17. Connecting this head and abutment in a web portion 18 of substantially semi-circular form in cross section which has a sliding fit with the contiguous wall of the body-section 12 and jointly with such parts constitutes a bowl-like chamber in which the nut may be said to be cracked. A spring 19 is disposed in the upper portion of the cylindrical body section and bears at one end against a closure-plug 20 removably fitted therein and at its opposite end against the abutment 17 to normally urge the nut-cracking plunger 14 to its retracted position shown by full lines in Figure 1. To prevent the plunger turning out of registering relation with the recessed portion of the nut-receiving section 12, it has a stud 21 thereon engaging a longitudinal slot 22 in the adjoining wall of such section.

The companion jaw or anvil 15 is relatively fixed but is adjustable toward and from the movable plunger-jaw 14 to readily set the device to the size of the nut being cracked. To this end it is mounted on the inner end of an adjusting screw 23 fitted in the closure-plug 20 and passing freely through a companion opening 24 in the abutment 17 of the plunger-jaw. A lock nut 25 serves to anchor the screw in a set position of adjustment. The bottom face of the jaw 15 is cupped similarly to that of the companion jaw to center and retain the nut in place during the cracking operation.

Mounted in a longitudinal slot 26 in and coextensive with the handle portion 11 of the nut cracker body is a pressure lever 27 for actuating the plunger-jaw 14. This lever is fulcrumed intermediate its ends on a pivot-pin 28 and its inner arm 29 abuts centrally against the underside of the jaw-head 16 with the spring 19 acting through the medium of the plunger-jaw to normally urge the lever to its retracted position shown in Figure 1. The outer or gripping edge of this lever may be shaped as shown to provide a firm hand grip when exerting a pressure on the lever for cracking the nuts, and its inner arm extends through a slot 30 formed in the adjoining wall of the nut-receiving or plunger guide section 12 of the nut cracker body, the bottom of such slot forming a shoulder against which the lever-arm 29 normally abuts.

The outer edge of the base or handle portion 11 of the device may be faced at its ends, as indicated at 31, to rest flatwise on a bench or table, when desired, and suitable openings 32 and 33 are provided in the cracker body to receive the bolts or clamps for securing the nut cracker in place thereon.

The operation of the device is believed to be obvious, suffice it to say that the jaw 15 is first properly adjusted to substantially the size or type of nuts being cracked, after which a nut is placed in the device and the pressure lever 27 actuated to crack the nut. During the cracking of the nut one hand may be cupped over the open side of the nut-receiving section 12 to confine the shells and nut meats. When mounted on a table, the device is operated in a like manner. For the cracking of exceptionally hard nuts, an extension rod 34 or the like is detachably applied to the pressure lever to obtain greater leverage, and as shown in the drawing the hinged end of this lever has a collar 35 secured to the outer edge thereof in which the inner end of the rod is inserted, while the outer end of the lever has a pad 36 or the like on which the rod is adapted to rest.

In the modified form of the invention shown in Figure 5, 37 indicates the nut cracker body, 38 the adjustable jaw and 39 the pressure lever. In this case, the movable jaw 40 constitutes an integral part of the pressure lever and a spring 41 is housed in the handle portion of the body and abuts against the lever to normally urge it to its inactive position.

While manifestly simple, compact and inexpensive in construction, this improved nut cracker is easy to operate and can be used in the hand or mounted on a table for use, and it is so designed that it can be readily dismembered for cleaning when desired.

I claim as my invention:

1. A nut cracker, comprising a substantially L-shaped body including a base portion adapted to serve as a handle and a cylindrical nut-receiving portion open at one side thereof, a plunger guided in said cylindrical portion and open at one side thereof in registering relation with the companion open side of such portion and terminating at that end thereof adjacent the base portion in a nut-cracking jaw, and at its opposite end in an abutment, a companion jaw mounted in the opposite end of the cylindrical portion of the body, a pressure lever fulcrumed on said base portion in operative relation to said plunger to bring its jaw into and out of nut-cracking relation with the companion jaw, and a spring in said cylindrical portion and engaging such plunger-abutment for normally urging the plunger and its actuating lever to a retracted, inoperative position.

2. A nut cracker, comprising a substantially L-shaped body including a base portion adapted to serve as a handle and cylindrical nut-receiving portion open at one side thereof and open at its outer end, a closure plug removably fitted in the outer end of said cylindrical portion, a plunger guided in said cylindrical portion and open at one side thereof in registering relation with the companion open side of such portion and terminating at one end in a nut-cracking jaw and at its opposite end in an abutment, a companion jaw arranged in the opposite end of the cylindrical portion of the body and suspended from said closure plug for axial adjustment, a pressure lever fulcrumed intermediate its ends on said base portion with the inner arm extending into the adjoining end of said cylindrical portion in operative relation to said plunger for actuating it into and out of nut-cracking relation with the companion jaw, and a spring housed in the cylindrical portion of the body between said plug and said abutment for normally urging said plunger and its actuating lever to a retracted inoperative position.

HARRY SPOONER.